Aug. 15, 1972  C. F. WENDLER ET AL  3,684,497
HEAT RESISTANT HIGH STRENGTH COMPOSITE STRUCTURE OF
HARD METAL PARTICLES IN A MATRIX, AND METHODS
OF MAKING THE SAME
Filed Jan. 15, 1970

INVENTORS
CHARLES F. WENDLER
CHARLES S. BAUM
BY Hauke, Gifford & Patalidis
ATTORNEYS 3,684,497
HEAT RESISTANT HIGH STRENGTH COMPOSITE STRUCTURE OF HARD METAL PARTICLES IN A MATRIX, AND METHODS OF MAKING THE SAME
Charles F. Wendler, St. Clair Shores, and Charles S. Baum, Grosse Pointe Farms, Mich., assignors to Permanence Corporation, Detroit, Mich.
Filed Jan. 15, 1970, Ser. No. 5,823
Int. Cl. C22c 29/00
U.S. Cl. 75—203    18 Claims

ABSTRACT OF THE DISCLOSURE

A high strength structure made of hard metal particles, such as metal carbide particles, brazed to each other in a porous lattice of a first brazing metal or alloy, the voids and spaces in the brazing metal or alloy being filled by a solidified second brazing metal or alloy of a melting point lower than the melting point of the first brazing metal or alloy. The second brazing metal or alloy may also contain a dispersion of hard metal particles, such as metal carbide particles, generally of a smaller size than that of the original hard metal particles. The structure is made by mixing a predetermined proportion of hard metal particles with the first brazing metal or alloy in the form of a powder, and by sintering in a furnace so as to obtain a substantially porous structure, followed by a second pass in the furnace of the porous structure covered with the second brazing metal or alloy in a powder form so as to impregnate the porous structure with the melted second brazing metal or alloy.

BACKGROUND OF THE INVENTION

The present invention relates generally to a composite structure including hard material particles, such as metal carbide particles, uniformly dispersed in a matrix of softer brazing metal or alloy.

For many commercial applications it is desirable to obtain a structure consisting of a material having qualitative characteristics generally considered as being opposite to each other. For example, to be used as heat resistant and drill proof armor plates for safe or vault protection, or for providing wear parts for some applications, the structural material utilized must have both hardness and toughness. However, tough materials such as some alloy steels are generally too soft for such applications and hard materials such as ceramics and other refractory materials, including cemented carbides and the like, are generally too brittle. A composite material consisting of relatively large size hard metal particles, such as certain metal oxides, borides, silicides, and preferably crushed cemented carbides such as tungsten carbide, uniformly dispersed in a tough, but softer, metallic matrix which provides an efficient brazing compound for uniting the particles to each other, results in a material which is both hard and tough, without any undue brittleness, which is generally heat resistant and which can not be drilled, punched or machined by conventional means. Such material also needs to be manufactured in plates of any desired thickness and of appropriate dimensions and shapes, in a manner which is inexpensive, efficient and capable of providing predictable repetitive results.

Structures are available according to the prior art for providing plates and other structures for use in lining burglar-proof vaults and safes. Such structures, as disclosed in U.S. Pats. Nos. 1,215,727; 1,422,295; 1,423,652; 1,444,610 and 1,464,102, for example, consist of a plurality of hard metallic chunks held in pockets of a cement or matrix material, such as cast iron, steel and the like. Such structures are generally made by placing the chunks of hard metallic material loosely in a mold and in pouring the molten binder into the mold.

Other structures, as disclosed, for example in U.S. Pats. Nos. 1,703,417 and 3,205,841, consist in an enclosure which is filled with a refractory material as a solid mass or in the form of a plurality of separate particles held in a softer matrix of a binder material, preferably a metallic binder.

Such prior art structures present many inconveniences and disadvantages, such as, for example, a lack of penetration of the binder material throughout the mass of the adjoining solid particles, and there is a lack of uniform dispersion of the particles in the binder material due to defective penetration and infiltration of the binder, before solidification, throughout the spaces and interstices between the particles. In addition, due to the difference in density between the hard material particles and the binder material, there is caused a migration of the hard material particles, resulting in portions of the structure being formed with regions too rich in solid particles or too rich in the binder material. Furthermore, there is often a lack of surface cohesion between the material of the solid particles or chunks of hard material and the material of the binder, with the result that the completed structure has poor homogeneity and cohesion, is substantially fragile to impact and can be easily pierced. The hard material particles are not fully bonded to each other and to the binder, such that they can be easily dislocated and that the structure is capable of crumbling under the influence of an external force or pressure.

The inconveniences of the prior art structures are avoided by the present invention which provides a truly brazed high strength structure consisting essentially of a plurality of hard material particles, such as particles of hard metals, metal oxides, silicides, borides and carbides, substantially uniformly dispersed in a softer metallic matrix consisting of a brazing metal or alloy which entirely fills the spaces between the particles and solidly bonds and brazes them to each other, the particles being substantially uniformly dispersed in the matrix. Such a structure is obtained by way of the process of the invention including two principal steps for making the structure. In the first principal step, a mixture of hard material particles, such as metal carbide particles or grit, and of a high melting point brazing metal or alloy in the form of a powder, with an appropriate flux and binder, is disposed in a mold and fired in a furnace for a time sufficient for completely melting the brazing metal or alloy and for raising the temperature of the melted metal or alloy and of the solid particles to a temperature sufficient to cause brazing of the particles to each other. Such temperature is herein designated as the "brazing" point of the brazing metal or alloy, and it is by definition the temperature at which the brazing metal or alloy is capable of wetting the surface of the particles and of causing a cohesion between the particles and the metal or alloy, to a limited depth below the surface of the particles. Such brazing point of the brazing metal or alloy is generally of the order of 100° F. to 300° F. (55° C. to 165° C.) or more above its melting temperature. Because a relatively small amount of brazing metal or alloy is used in the first step or "pass" of the process of the invention, migration of the particles is completely eliminated, the quantity of brazing metal or alloy being sufficient only to cause a superficial plating of the particles with the brazing metal or alloy and brazing of the particles to each other. The structure obtained after the first "pass" of the invention is thus relatively porous and consists of the hard material particles held together by way of a uniting lattice formed by the solidified brazing metal or alloy, including a plurality of interspaces, voids and interstices uniformly distributed throughout the structure.

The structure also has a subtantially rough surface. According to the invention, the substantially porous structure thus obtained is covered with a layer of a second brazing metal or alloy, having a melting point approximately 100° F. to 300° F. (55° C. to 165° C.) or more lower than that of the first brazing metal or alloy. The second brazing metal or alloy is in a powder form and is mixed with a small quantity of an appropriate flux. The structure with the layer of second brazing metal or alloy on its surface is then fired in a furnace at a temperature and for a time sufficient to cause complete melting of the second brazing metal or alloy which, in its melted form, impregnates the substantially porous lattice of the structure, fills all the voids and interstices therein, and substantially smooths the surface of the structure by filling all the depressions and cavities therein. The temperature at which the structure is heated in the course of the second pass in the furnace is the brazing point, as hereinbefore defined, of the second brazing metal or alloy such that the final matrix interconnecting all the solid particles in a uniform suspension in the mass of the structure is a solid matrix with the second metal or alloy completely filling all the voids, cavities and interstices within the mass of the structure. Preferably, the second brazing metal or alloy includes a certain quantity of hard material particles, such as metal carbide grit, of a particle size range preferably smaller than the particle size range used to form the porous structure in the course of the first pass, such that some of the smaller particles in the second pass tend to settle and follow the molten second brazing or alloy into the voids, cavities and interstices in the first metal or alloy lattice, and that the depressions and cavities in the surface of the structure are at least partly filled with a dispersion of the second pass particles in the matrix forming an integral part of the final structure.

Where it is desired to make a structure having substantial thickness, two or more of the relatively porous and relatively thin structures or bodies, obtained by way of the first pass in the method of the invention, are superimposed on top of each other, with a layer of the second brazing metal or alloy paste interposed therebetween and a layer of the second brazing metal or alloy paste disposed on the top of the upper body. After firing in the course of a second pass through the furnace, the two bodies are integrally united by means of the second brazing metal or alloy, and all the interstices, crevices and voids in the whole structure are entirely filled by the solidified second brazing metal or alloy. The second brazing metal or alloy paste may also contain hard material particles, such that these hard material particles are caused to partly fill the interstices, voids and cavities, with the balance thereof being filled by the second brazing metal or alloy, in such manner that the finished structure is a solid and dense structure containing hard material particles substantially uniformly dispersed throughout the mass of the structure, coherently united by means of the first and second brazing metals or alloys completely filling all the interstices, voids and cavities between adjoining particles. In such manner, although it has been found that is is preferable to form the first pass porous body structure with a limited thickness of, for example, about ¼ in. (6 to 7 mm.), structures of any thickness may nevertheless be obtained economically and efficiently by way of the process of the present invention.

SUMMARY OF THE INVENTION

The present invention, therefore, relates to novel heat resistant, high strength structures consisting essentially of a solid body comprising a plurality of hard material particles, such as metal, metal oxide, silicide, boride, or carbide particles or grit, substantially uniformly and coherently dispersed throughout the mass of the body, with all the particles solidly bonded and brazed to each other and with all the interstices, voids and cavities in the mass of the body completely filled by a matrix of an appropriate metal alloy, and to novel processes for manufacturing such structures. The object of the invention is to obtain such structures consisting of a plurality of hard material solid particles solidly imbedded in a matrix of softer metal for the purpose of providing structures which are substantially drill proof, punch resistant and heat resistant and which have utility as armor plates for safes and vaults, fire-proof walls, friction members, abrasive tools and the like. When the structures are used as armor plates, the hard material particles, for example metal carbide particles, in the armor plate structure afford complete protection against penetration by a drill or other tool, even when made of hardened alloy steel, carbide, and the like, and the armor plate is also substantially impregnable to the cutting flame of an oxygen-acetylene or oxygen-hydrogen torch, as it has a high heat conductivity which permits it to conduct heat away at a higher rate than that of the heat supplied by the torch flame. In addition, the structure has considerable self-healing properties which enables it to substantially reconstruct itself even though part of the matrix may have been locally and superficially melted by the flame.

BRIEF DESCRIPTION OF THE DRAWINGS

The many objects and advantages of the present invention will become apparent to those skilled in the art when the description of some of the best modes contemplated for practicing the invention is read in conjunction with the accompanying drawings wherein.

DETAILED DESCRIPTION OF THE PREFERRED EMBODIMENTS

Figure 1:
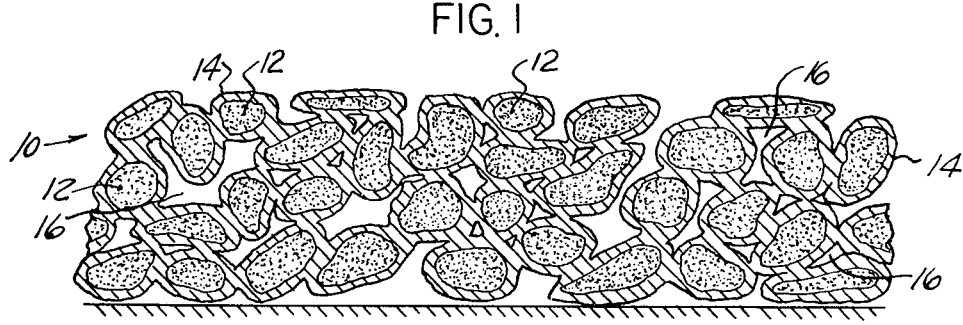
FIG. 1 schematically represents in an exaggerated manner a partial sectional view through the structure obtained by the method of the invention after the first main step or "pass" in such method.

The present invention contemplates making composite structures of a dispersion of hard material solid particles brazed to and in a matrix of a softer metal alloy or alloys. The hard material solid particles may be in the form of particles or grit of diverse metals, metal oxides, borides, silicides or carbides, which are well known in the art as being very hard but generally brittle. The hard metal particles are preferably made of refractory metal cemented carbides, such as, for example, cemented tungsten carbide and the like, and the examples hereinafter will preferably refer to the use of particles of such metal carbides and more particularly tungsten carbide for the purpose of making structure useful as armor plates and the like for vaults and safes, as friction surfaces and as abrasive members such as grinding wheels and the like, although it will be obvious that the methods of the present invention are applicable to making structures including hard material particles other than cemented carbides, such as hard metal alloys, metal oxides, borides or silicides.

There is a plentiful supply of cemented tungsten carbide parts such as worn or broken "throw-away" cutting inserts, a considerable tonnage of which is used and discarded daily in manufacturing plants in which such throw-away cutting inserts are used in appropriate holders for machining workpieces in screw machines, lathes, milling machines and the like. The invention provides an economical re-use of such discarded pieces of tungsten carbide and the like, which may be acquired at a relatively low cost after they have accomplished their initial purpose.

One of the advantages of the present invention is that it permits to make high strength and heat resistant plates and structures, grinding wheels, friction members, etc., utilizing recovered crushed carbide or grit in a molded matrix. The recovered carbide is degreased by means of conventional commercial degreasing agents or detergents and crushed in conventional crushing machines.

According to a general aspect of the present invention, a composite structure comprising a plurality of hard material particles, such as cemented carbide grit, in a softer matrix of brazing metal or alloy is obtained by a process including two principal manufacturing steps, as will be explained hereinafter in further details. For example, a predetermined quantity of degreased carbide grit is weighed. The grit is of a predetermined particle size range, preferably of a particle size range of 6/20, or minus 6 to plus 20 (U.S. mesh size standard). Such particle size range consists of particles which are capable of passing through a No. 6 mesh size sieve, but which are retained by a No. 20 mesh size sieve. It is of course obvious that if it is desired to make a structure containing a greater distribution of larger particles, another particle size range such as for example 6/10 can be used or any other convenient size. However, for particular applications of the structures of the invention to armor plates for vaults, safes and the like, a particle size range of 6/20 has been found to be preferable. The predetermined weight of carbide grit of the appropriate particle size range is premixed with a predetermined quantity, or weight, of a first powder brazing metal or alloy, with a small quantity of flux and binder. A convenient binder has been found to be an acrylic plastic binder, sold under the name of Nicrobraz 500 by the Wall Colmonoy Corporation. A small quantity of brazing liquid flux is added to the mixture, such flux being usually of the type recommended by the supplier of the brazing metal or alloy, and known in the trade under the trademarks of Nicrobraz flux, Vapoflux flux, supplied by the Wall Colmonoy Corporation, and the like. Enough flux is used to form a consistent paste. The proportions by weight of carbide grit and brazing metal or alloy in the paste may vary from approximately two parts of grit to one part of braze to five parts of grit to one part of braze. The paste is placed in an appropriate mold made of a high purity refractory material, pre-purified in a hydrogen furnace, appropriate materials for such a mold comprising "glass-rock," alumina and like materials. The paste is placed in the mold in a thickness of about ¼ to 3/16 in. (6.5 to 5 mm.), and the mold is disposed in a furnace having a dry hydrogen atmosphere for a period of time of about twenty minutes, and is heated to a temperature depending from the composition of the brazing metal or alloy but generally in the neighborhood of 2000 to 2200° F. (1100 to 1200° C.). The mold is then cooled to a temperature of 300° F. (150° C.) or below before removing from the furnace.

This constitutes the first principal step, or "pass" of the process of the invention. Examples of powder metals and alloys which have been found suitable as a brazing material for the first "pass" or step in the process of the invention include AMI 100 nickel braze, made by Alloy Metals, Inc., and having the following approximate composition: chromium 19%, iron 3%, manganese .5%, silicon 10%, cobalt .5% and carbon .15%, the balance being nickel. The brazing point of such alloy is in the neighborhood of 2100–2175° F. (1150–1190° C.). Other convenient nickel brazes for use in the first pass in the process of the invention are NB 150 and NB 160 sold by Wall Colmonoy Corporation. NB 150 braze has a composition of: chromium 15% and boron 3.5%, the balance being nickel. NB 160 has a composition of: chromium 11%, iron 3.5%, boron 2.5%, silicon 3.5% and carbon .5%, nickel being the balance. A convenient braze temperature for NB 150 is in the range of 1950–2200° F. (1065–1200° C.), and the brazing temperature for NB 160 is in the range of 2100–2200° F. (1150–1200° C.). It has also been found that copper powder is also a convenient brazing material for the first pass in the process of the invention. The brazing temperature range of copper is in the neighborhood of 2000–2100° F. (1100–1150° C.).

The structure removed from the furnace after the first pass of the process of the invention is substantially as schematically shown at FIG. 1. It is in the form of a porous body 10 including a plurality of carbide particles as shown at 12 superficially coated and plated with the brazing metal or alloy, as shown at 14, the brazing metal or alloy forming a skeleton or lattice brazing each particle 12 of carbide to the adjoining particles so as to form a substantially porous structure including a plurality of interspaces, voids or interstices as shown at 16.

According to a first aspect of the invention, the porous body 10 is subjected to a second pass in a furnace for the purpose of filling all the voids, cavities and interstices in the skeleton or lattice with a second brazing metal or alloy having a melting temperature, and consequently a brazing temperature, approximately 100–300° F. (55–165° C.) lower than that of the brazing metal or alloy utilized in the first pass. For that purpose, the porous body 10 is covered, in such first aspect of the invention, with a layer of a mixture made of an appropriate low melting brazing metal or alloy and of an appropriate flux. Preferably, the quantity of second brazing metal or alloy used varies from one part by weight to four parts by weight of the first brazing metal or alloy used in the first pass, the preferred proportions being such that for each part by weight of carbide in the finished structure there is from .75 to 1 part by weight of the total weight of first and second brazing metals or alloys.

Figure 2:
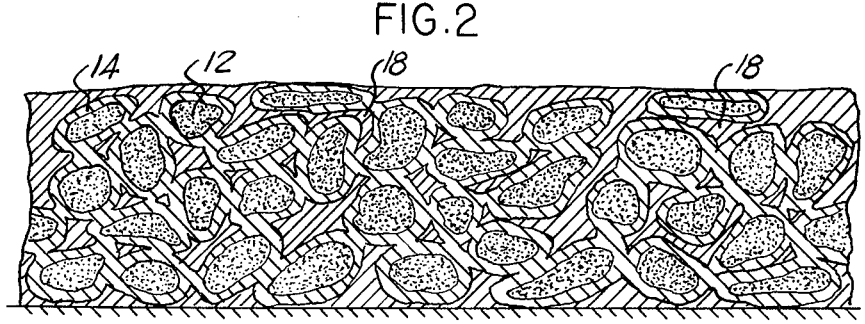
FIG. 2 is a view similar to FIG. 1 but showing an example of finished structure after the second main step or "pass" of the method of the present invention, according to a first aspect of the invention.

The porous body or structure with a layer of the second brazing metal or alloy mixture on the top thereof is then placed in the dry hydrogen furnace for about 20 minutes at a temperature generally in the neighborhood of 1600° to 1900° F. (870° to 1040° C.). During the second pass in the furnace, the second brazing metal or alloy infiltrates the porous structure such that the resulting structure is substantially as shown at FIG. 2, wherein all the voids, cavities and interstices in the original skeleton or lattice are now filled with solidified second brazing metal or alloy as shown at 18.

Examples of brazing alloys which have been found convenient for the second pass according to the invention include AMI 716, made by Alloy Metals, Inc., and having a composition of: copper 52% by weight, nickel 10% by weight and manganese 37% by weight. Its brazing temperature is in the range of 1750–1800° F. (955°–982° C.). Another convenient brazing alloy for the second pass according to the present invention is H—H 090, supplied by Handy and Harmon, and having an approximate composition of: nickel 9%, and manganese 23%, copper being the balance. Its brazing temperature is in the range of 1750–1800° F. (955°–982° C.). Powdered bronze, generally of a composition of: nickel 10%, zinc 20% and tin 5% by weight, copper being the balance, is also a convenient second pass alloy, with a brazing temperature comprised between 1600 and 1700° F. (870–927° C.) Nickel braze such as NB 10 made by Wall Colmonoy Corporation, containing 11% of phosphorus, the balance being nickel, is also a convenient second pass braze with a brazing temperature of 1750–1850° F. (955–1010° C.).

Figure 3:
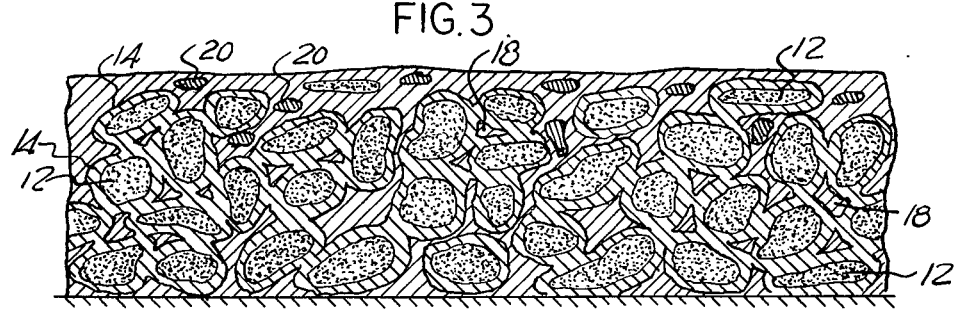
FIG. 3 is a view similar to FIG. 2 but showing another example of finished structure after the second main step or "pass" according to a modification of the present invention.

According to a further aspect of the present invention, the second pass brazing mixture may also include hard material particles or grit, such as for example, carbide grit. It is preferable to use a grit of a smaller mesh size than the grit used in the first pass of the process, such particle size for the grit being generally 10/20 to 10/50, or even smaller. When grit is used in the brazing paste of the second pass, approximately one part by weight of grit is mixed with two parts by weight of braze to five parts by weight of braze, the exact proportion used being preferably the required proportion that will provide in the final structure a proportion of grit weight to total brazing metals or alloys weight in the range of about 1 to 1 to 1 to .75. The second pass mixture including the grit is disposed in a layer above the porous body obtained by the first pass of the process of the invention, and the body is placed in a furnace for an appropriate period of time at a temperature above the brazing temperature of the second brazing metal or alloy. The second brazing metal or alloy liquifies and impregnates the porous body. However, by capillary and gravity action, a small quantity of the grit also penetrates the porous body to a certain degree such that the voids and interstices in the original skeleton are, as shown in FIG. 3, partly filled by hard particles 20 of the second pass grit solidly imbedded in and brazed to the second brazing metal or alloy 18, although all the depressions and voids on the surface of the body contain a greater proportion of the second grit particles 20.

The finished article, therefore, consists of a relatively soft matrix of the brazing metals or alloys in which is substantially uniformly dispersed a plurality of harder material particles, such as metal carbide, oxide, silicide or boride particles, according to the class of material used for providing the grit.

Figure 4:
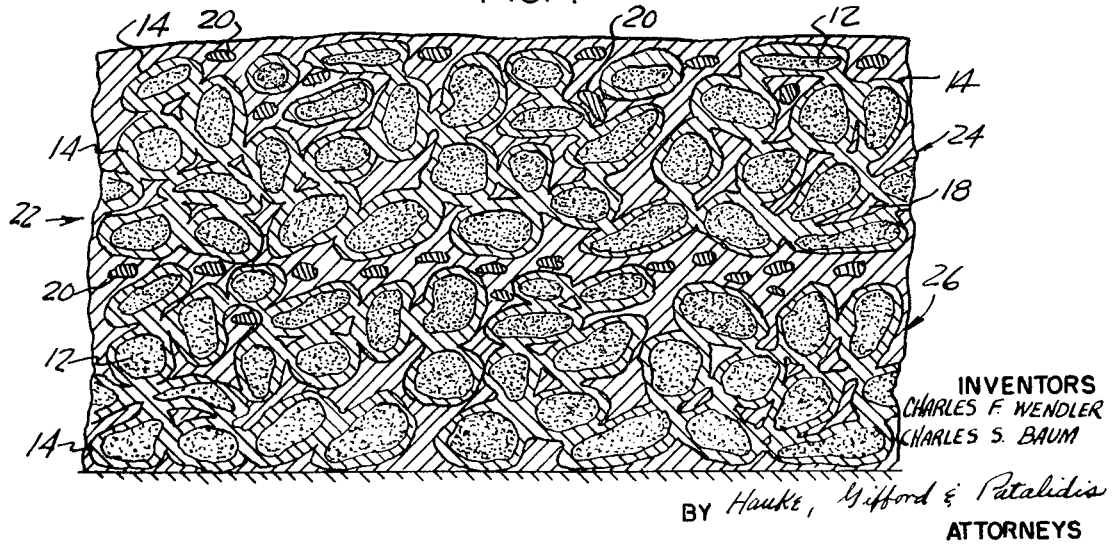
FIG. 4 is a schematic illustration in partial section of a finished structure of substantial thickness obtained according to a further aspect of the method of the present invention.

By originally placing a steel plate at the bottom of the mold before pouring therein the braze and grit mixture prior to the first pass of the process of the invention or by placing the mixture in an open top steel box the steel plate or open box is solidly brazed to the matrix imbedding the hard material particle. It is obvious that any configuration of mold can be used and that if inserts such as pins, bolts, rims, plates, brackets and the like are sought to be attached to the structure, they may be placed in the braze and grit paste and held in any convenient manner before either the first or second pass through the furnace. It has been found that making structures according to the invention in thickness of approximately 3/16 to 1/4 in. (5 to 6.5 mm.) provides the best results. When it is desired to form structures thicker than 3/16 to 1/4 in. (5 to 6.5 mm.), any convenient number of porous bodies, in the form of plates, obtained as a result of the first pass through the furnace according to the invention, are superimposed on top of each other with an intermediary layer of the second brazing metal or alloy, a layer of the second brazing metal or alloy being also disposed on the top of the upper plate. The second brazing metal or alloy may contain hard material particles if so required, according to the type of structure desired. A plurality of superimposed "first pass" plates with a layer of brazing metal or alloy paste sandwiched between adjoining plates is then fired in the furnace in the same manner as hereinbefore generally explained with respect to the second pass of the invention, and when the structure is removed from the furnace and cooled, there results a structure of any appropriate thickness, such as shown at 22 in FIG. 4 which illustrates an example of structure wherein two substantially thin first pass plates were superimposed with an intermediary layer of a paste of the second brazing metal or alloy containing a quantity of grit of smaller particle size than the grit originally used in making the first pass plates, and on the top of the upper plate, with a layer of such second braze and grit paste. The resulting structure is the solid body 22 consisting of the two original plates as shown at 24 and 26 with the skeleton or lattice thereof formed by the first brazing metal or alloy 14 having its voids and interstices filled by the solidified second brazing metal alloy 18, including a quantity of the smaller grit particles 20. It can thus be seen that the present invention permits to fabricate structures of any appropriate shape and thickness.

The structures obtained by the present invention are tough, not brittle, and can be conveniently used for, among other, fire-proof walls, as friction surfaces, grinding wheels and armor plates, for example for safes and vaults. In view of the presence of a relatively soft matrix imbedding the separate hard material particles, the structure can withstand considerable impact without fracture. The hard material particles uniformly distributed in the matrix afford protection against drilling. When the particles are made of metal carbide grit, the structure affords complete protection to drill penetration except perhaps to the penetration by a diamond drill utilized with special lubricant, which is generally not available to burglars seeking to open a safe or a vault. The heat conductivity of the structure is such that it is also impregnable to a cutting torch, and the localized melting of the matrix causes a self-healing and reconstruction of the structure as soon as the application of heat is removed from a portion of the structure.

For the sake of specifically illustrating the present invention by way of specific examples of the process herein disclosed, reference may be had to the following examples given for illustrative purpose only and not in a limitative sense:

Example 1

A glass rock mold is used, formed as a rectangular dish with a recessed portion having a depth about two or three times the final thickness desired in the structure. A predetermined weight of 6/20 mesh tungsten carbide grit, for example 600 gr. is mixed with about 1/3 of that weight, or 200 gr., of pure copper powder. The copper powder is fine enough to pass through a No. 100 mesh size and about one fluid ounce (30 ml.) of NB 500 cement and about one fluid ounce of Vapoflux flux are used per 500 gr. of grit, thus forming a substantially thick paste. The paste is poured at the bottom of the mold so as to form a layer about 1/4 in. (6.5 mm.) thick, and the mold is placed in a furnace filled with dry hydrogen, is heated to 2050° F. (1120° C.) for fifteen minutes, and is allowed to cool thereafter in the furnace still filled with dry hydrogen.

The mold is then removed from the furnace and the surface of the solidified substantially porous plate in the mold is covered uniformly with a paste containing one-half of the weight of grit used in the first pass, or 300 gr., of 10/50 tungsten carbide grit with a weight of nickel-phosphorus braze, such as Nicrobraz 10 supplied by Wall Colmonoy Corporation, equal to the weight of the 6/20 carbide of the first pass, or 600 gr. A small quantity of NB 500 Nicrobraz cement and a small quantity of flux such as Vapoflux is added to the mixture. The paste is placed on the top of the first pass plate and the mold is returned in the dry hydrogen furnace and is heated to 1800° F. (982° C.) for about fifteen minutes.

Upon removing of the mold from the furnace, a plate about 1/4 in. (6.5 mm.) thick is obtained, which is dense, non-brittle, heat resistant and resistant to drill penetration.

Example 2

The same materials, in the same proportions, as in Example 1 are placed in a mold for the first pass of the mold in the furnace. After the mold is removed from the furnace, the surface of the first pass plate in the mold is covered uniformly with a mixture containing one half of the weight of grit used in the first pass, or 300 gr., of 10/20 tungsten carbide grit, with the same weight, or 300 gr., of nickel-phosphorus braze, such as Nicrobraz 10 with a small quantity of NB 500 Nicrobraz cement and Vapoflux flux for forming a paste. On the top of the layer of carbide grit containing paste is placed a layer of a paste made exclusively of 300 gr. of the same nickel-phosphorus braze with a small quantity of cement and flux. The mold is returned to the dry hydrogen furnace and is heated to 1800° F. (982° C.) for about

Example 3

A first pass plate is made according to the first pass plate of Examples 1 and 2. Prior to the second pass, the plate is covered uniformly with a mixture of 300 gr. of 10/50 tungsten carbide grit and 600 gr. of bronze powder, of the composition hereinbefore indicated, namely consisting of 10% nickel, 20% zinc, 5% tin, and the balance consisting of copper. A small quantity of cement and flux is used to form a consistent paste. The second pass is effected in a dry hydrogen furnace at about 1700° F. (900° C.) for about fifteen minutes.

Example 4

In a glass rock mold, having a cavity 2¾ in. x 5¼ in. x ⅜ in. (70 mm. x 133 mm. x 9.5 mm.) was placed a mixture consisting of a heavy paste made by weighing one-half pound (227 gr.) of 6/20 mesh of clean cemented tungsten carbide grit wetted with Vapoflux flux to which was added about one fluid ounce (30 ml.) of NB 500 binder and 1/10 of a pound (45 gr.) of pure copper powder (capable of passing through a mesh size No. 325). The mold was placed in the hydrogen furnace for twenty minutes at 2050° F. (1120° C.) After cooling in the furnace, the mold was removed from the furnace and the surface of the first pass structure was covered with a mix made of ¼ pound (114 gr.) of 10/20 mesh tungsten carbide grit and ⅝ of a pound (282 gr.) of AMI 716 brazing alloy, supplied by Alloy Metals, Inc. and having a composition as hereinbefore indicated. A small quantity, sufficient to form a paste, of NB 500 cement and Vapoflux flux was added to the mix. The mold was then placed in the hydrogen furnace and heated at 1825° F. (996° C.) for twenty minutes, thus providing upon cooling a substantially smooth surfaced plate, about ¼ in. (6.5 mm.) thick, which was flame resistant, resistant to a drill penetration and having considerable strength under impact.

Example 5

An example was prepared in the same manner as indicated hereinbefore at Example 4, except that the material used in the second pass of the process consisted exclusively of 4/10 of a pound (182 gr.) of AMI 716 brazing alloy with a small quantity of Vapoflux flux and cement. The second pass was effected in the hydrogen furnace at a temperature of 1825° F. (996° C.) for twenty minutes and resulted in a dense compact structure, with a substantially smooth surface, and substantially resistant to drill penetration and flame cutting.

Example 6

Several plates about 3½ x 4½ in. (89 x 114 mm.) were made in the first pass according to the invention, placing in each mold a mixture consisting of 400 grams of 6/20 tungsten carbide grit, one fluid ounce (30 ml.) of Vapoflux flux, one fluid ounce (30 ml.) of NB 500 cement and 200 grams of AMI 100 brazing alloy. The molds were placed in the hydrogen furnace at 2100° F. (1150° C.) for twenty minutes.

A paste was prepared with 200 grams of 10/20 cemented tungsten carbide grit with 100 grams of NB 10 brazing alloy with a small quantity of flux and cement. A layer of the paste about ⅛ in. (3 mm.) thick was placed on the top of a plate, another plate was disposed on the top of the layer of paste and the remaining of the paste was disposed on the top of the upper plate. The mold was returned to the hydrogen furnace and heated at a temperature of 1825° F. (996° C.) for twenty minutes. The resulting structure was a composite plate 3½ x 4½ x ½ in. (85 x 114 x 13 mm.) having a substantially homogeneous structure with all voids and interstices of the first pass plate skeleton or lattice completely filled with the solidified second brazing alloy, the two original plates being solidly brazed to each other, such as to form a structure approximately twice the thickness of the original first pass plates. All tests indicated that the two original plates were bonded to each other in such manner that they could not be separated.

Example 7

Example 4 was repeated. However, the first pass plate was removed from the mold and a steel plate about 1/16 in. (1.59 mm.) in thickness, cut to appropriate dimensions to fit the mold was disposed at the bottom of the mold. A second steel plate of the same dimensions and thickness was placed on the top of the second pass brazing paste before returning the mold to the furnace for the second pass. The finished part consisted of a structure including carbide particles regularly dispersed within the matrix formed by the two brazing alloys with an upper and a lower steel plate brazed to the structure. Different tests were effected in an attempt to separate the plates from the carbide particles-matrix structure, and it was found that both steel plates were solidly brazed to the remaining of the structure, due to the fact that in the course of the second pass through the furnace the second brazing alloy was thoroughly melted and caused to penetrate and permeate the whole mass of the structure, filling all the voids and interstices in the first brazing alloy skeleton or lattice.

Example 8

Example 4 was repeated. However, two 5 in. (127 mm.) long steel plates, about 1/16 (1.59 mm.) of an inch in thickness and about ½ in. (13 mm.) in width were disposed in the mold along the longer edges thereof before pouring in the mold the first pass mixture paste. Several studs, in the form of steel bolts, were pressed through the paste until their ends engaged the bottom of the mold. The first and second passes were effected as indicated with respect to Example 4 and the finished part consisted of a structure similar to the structure of Example 4 but comprising the two narrow steel plates securely brazed to the two longer edges of the structure, and the studs also solidly brazed in the structure and projecting from the surface thereof. Different tests were run in an attempt to separate the rim forming steel plates from the edge of the structure and pull the studs from the structure. It was found that the steel rim and the studs were solidly brazed to the structure and could not be separated or dislodged therefrom, thus providing a structure with integrally brazed support means for attaching to another structure.

Example 9

Two plates were made in molds 2¾ x 4⅜ in. (83 x 11 mm.) by placing in each mold a mixture consisting of 250 gr. of 6/10 carbide grit and 125 gr. of Nicrobraz 150, with sufficient flux and cement to form a consistent paste. The molds were placed in the dry hydrogen furnace at about 2000° F. (1095° C.) for about twenty minutes.

After cooling and removing of the molds from the furnace, one of the first pass plates, still in its mold, was covered with a layer of a mixture of 100 gr. of Nicrobraz 10 with enough flux and cement to form a paste. The second plate was disposed on top of that layer and covered in turn with a mixture consisting of 150 gr. of Nicrobraz 10 with a small quantity of cement and flux. The mold was returned to the dry hydrogen furnace and heated at a temperature of 1800° F. (982° C.) for about twenty minutes. The finished part consisted of a solid structure about ½ in. (13 mm.) in thickness, of the same quality as the structure of Example 6.

Example 10

A structure was made according to the present invention by utilizing as a first pass mixture 400 gr. of 6/10 carbide grit premixed with 100 gr. of AMI 100 braze, with enough flux and cement to form a consistent paste. A layer about ¼ in. (6.5 mm.) thick was disposed at the bottom of a mold and the mold was placed in a dry hydrogen furnace where it was heated at about 2150° F. (1175° C.) for about fifteen minutes.

After cooling and removal of the mold from the furnace, the structure obtained in the course of the first pass was covered with a paste made of 500 gr. of 10/20 carbide grit premixed with 500 gr. of Nicrobraz 10 brazing alloy, with a small quantity of flux and cement. The mold was returned to the dry hydrogen furnace and heated at 1800° F. (982° C.) for fifteen minutes. After cooling and removal from the furnace, a compact structure was obtained which was used as an abrasive stone.

In order to practice the present invention, the hard material particles or grit need to be substantially clean. However, simple degreasing of the particles or grit by means of conventional industrial solvents is usually all that is required. Preferably, the atmosphere of the furnace must be an inert gas or hydrogen so as to prevent oxidation during the forming of the structure according to the process of the present invention. The boats or molds, as previously mentioned, are made of a heat resistant inert material, such as glass rock or alumina.

Having thus described the invention by way of typical examples of the structures and of the process best contemplated for accomplishing the objects thereof, what is sought to be protected by United States Letters Patent is as follows:

1. A method of making a heat resistant high strength homogeneous structure comprising the steps of: making a mixture of hard metal particles of a predetermined particle size range with a relatively small quantity of a first powder brazing material and a flux, placing said mixture in a mold in a furnace heated at a first predetermined temperature above the brazing point of said first powder brazing material for a period of time sufficient to melt said first powder brazing material to form a substantially porous body of said hard metal particles dispersed and brazed in a matrix of said first brazing material, placing a layer of a second powder brazing material having a brazing point lower than the brazing point of said first brazing material and a flux on the top surface of said porous body, said layer including hard metal particles of a predetermined particle size, and heating in a furnace at a temperature above the melting point of said second brazing material and below the melting point of said first brazing material for a time sufficient to substantially impregnate said porous body with said second brazing material.

2. The method of claim 1 wherein the ratio of the total weight of said first and second brazing materials to the weight of said hard metal particles included in said first brazing material is comprised between about .75 to 1 and 1 to 1.

3. The method of claim 1 wherein the particle size of said hard metal particles is 6/20 mesh size.

4. The method of claim 1 wherein said second powder brazing material comprises from 2 to 5 parts by weight of said second powder brazing material for each part by weight of hard metal particles therein.

5. The method of claim 1 wherein the particle size of said hard metal particles in said second powder brazing material is 10/20 mesh size.

6. The method of claim 1 wherein the particle size of said hard metal particles in said second powder brazing material is 10/50 mesh size.

7. The method of claim 1 wherein the ratio of the total weight of said first and second brazing materials to the total weight of hard metal particles is comprised between about .75 to 1 and 1 to 1.

8. The method of claim 1 wherein said structure has a thickness of approximately ³⁄₁₆ to ¼ inch.

9. The method of claim 1 wherein said hard metal particles are metal carbide particles.

10. A method of making a heat resistant high strength composite structure comprising the steps of: making at least a pair of plate members each of a mixture of hard metal particles of a predetermined particle size range with a relatively small quantity of a first powder brazing material and a flux, placing said mixture in a mold in a furnace heated at a first predetermined temperature above the brazing point of said first powder brazing material for a period of time sufficient to melt said first powder brazing material to form in each mold a substantially porous body of said hard metal particles dispersed and brazed in a lattice of said first brazing material, placing a layer of a second powder brazing material having a melting point lower than the melting point of said first brazing material and a flux on the top surface of one of said plate members, said layer including hard metal particles of a predetermined particle size, disposing another of said plate members on the surface of said layer of second powder brazing material, placing on the surface of said other of said plate members a layer of said second powder brazing material in the form of a paste of said brazing material and a flux, said layer including hard metal particles of a predetermined particle size, and heating in a furnace at a temperature above the brazing point of said second brazing material and below the melting point of said first brazing material for a time sufficient to substantially impregnate both said porous body plate members with said second brazing material and to form said composite structure upon cooling.

11. The method of claim 10 wherein the ratio of the total weight of said first and second brazing materials to the weight of said hard metal particles included in said first brazing material is comprised between about .75 to 1 and 1 to 1.

12. The method of claim 10 wherein the particle size of said hard metal particles is 6/20 mesh size.

13. The method of claim 10 wherein said second powder brazing material comprises from 2 to 5 parts by weight of said second powder brazing material for each part by weight of hard metal particles therein.

14. The method of claim 10 wherein the particle size of said hard metal particles in said second powder brazing material is 10/20 mesh size.

15. The method of claim 10 wherein the particle size of said hard metal particles in said second powder brazing material is 10–50 mesh size.

16. The method of claim 10 wherein the ratio of the total weight of said first and second brazing materials to the weight of said hard metal particles is comprised between about .75 to 1 and 1 to 1.

17. The method of claim 10 wherein each of said plate members has a thickness of approximately ³⁄₁₆ to ¼ inch.

18. The method of claim 10 wherein said hard metal particles are metal carbide particles.

References Cited

UNITED STATES PATENTS

| | | | |
|---|---|---|---|
| 2,042,635 | 6/1936 | Schellens | 75—212 X |
| 3,407,061 | 10/1968 | Hutkin | 75—208 |
| 2,817,601 | 12/1957 | Shigley | 75—208 X |
| 2,401,483 | 6/1946 | Hensel | 102—92.6 |
| 3,373,003 | 3/1968 | Schreiner | 75—208 X |
| 3,322,774 | 7/1967 | Tuttle | 75—208 X |
| 3,343,955 | 9/1967 | Talmage | 75—208 |
| 2,765,277 | 10/1956 | Goetzel | 29—182.1 X |

CARL D. QUARFORTH, Primary Examiner

R. E. SCHAFER, Assistant Examiner

U.S. Cl. X.R.

75—200, 201, 202, 204, 206; 29—182.1

PER-101-A-1

UNITED STATES PATENT OFFICE
CERTIFICATE OF CORRECTION

Patent No. 3,684,497                    Dated   August 15, 1972

Inventor(s)    Charles F. Wendler et al

It is certified that error appears in the above-identified patent and that said Letters Patent are hereby corrected as shown below:

IN THE REFERENCES CITED

Change "2,765,277" to - - 2,765,227 - -

Signed and sealed this 9th day of January 1973.

(SEAL)
Attest:

EDWARD M. FLETCHER, JR.              ROBERT GOTTSCHALK
Attesting Officer                     Commissioner of Patents

FORM PO-1050 (10-69)                                    USCOMM-DC 60376-D69